Sept. 15, 1931.  L. HORST  1,823,400
PHOTOGRAPHIC FILM COPYING DEVICE
Filed March 9, 1928  2 Sheets-Sheet 1
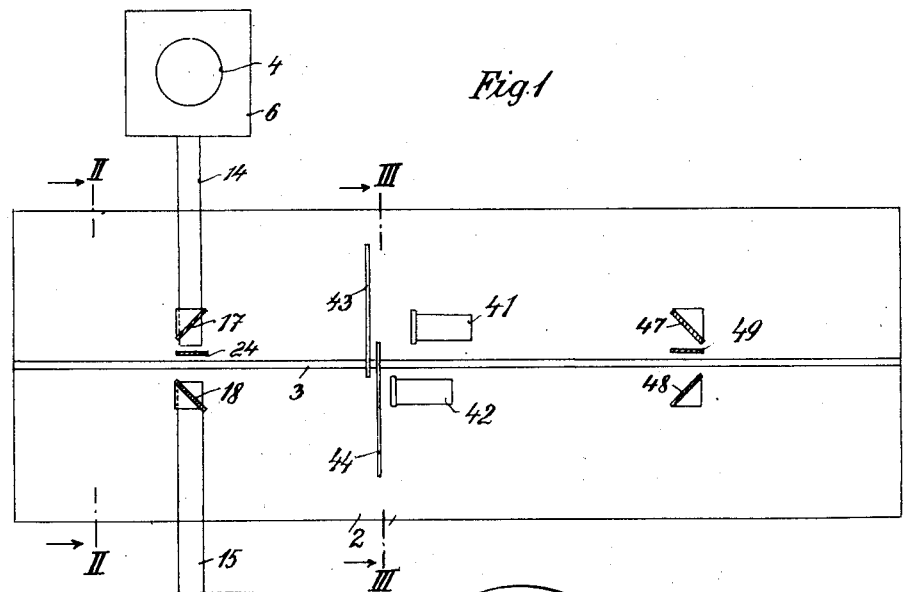
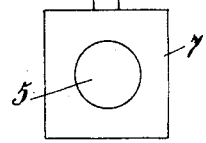
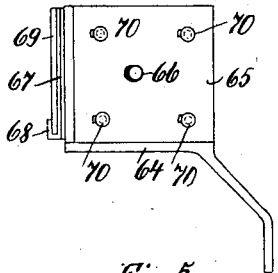
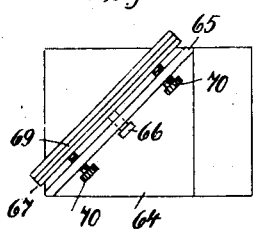
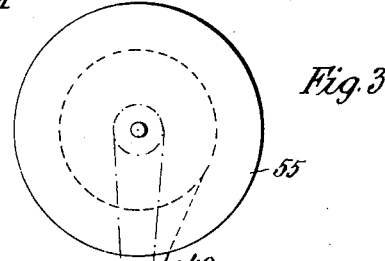
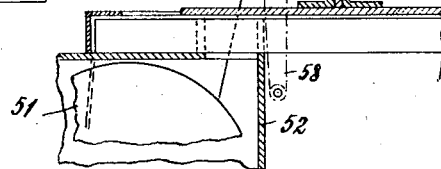

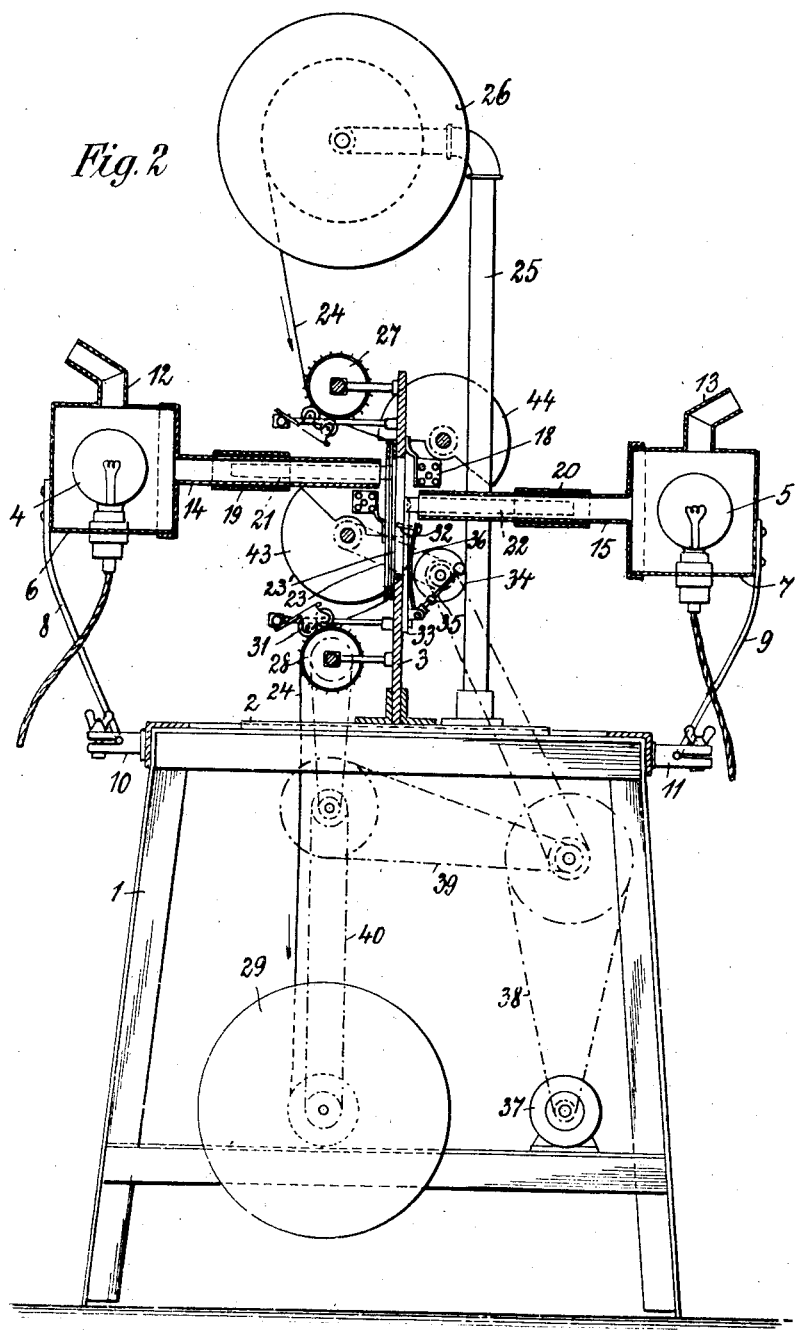

Patented Sept. 15, 1931

1,823,400

UNITED STATES PATENT OFFICE

LUDWIG HORST, OF BERLIN-WILMERSDORF, GERMANY, ASSIGNOR TO SIRIUS KLEUREN-FILM-MAATSCHAPPIJ, OF BOSCH EN DUIN, NEAR UTRECHT, NETHERLANDS

PHOTOGRAPHIC FILM COPYING DEVICE

Application filed March 9, 1928, Serial No. 260,398, and in Germany April 8, 1927.

My invention relates to a machine for copying two-color films and more particularly to a machine of this kind in which the pictures are transferred from one film to the other by means of mirrors and objectives provided in duplicate.

In known machines for similar purposes a single source of light only is provided for exposing the negative film, so that difficult adjustments of the optical devices are necessary, if faults in copying the individual part pictures are to be avoided.

According to my invention a particularly advantageous solution of the problem is obtained by providing two sources of light, each of which is separately regulable, for tuning the degree of copying of the individual part pictures.

It is thus possible to obtain at each instant for each part picture the light intensity necessary for copying by simply regulating the supply of current to each of the two sources of light.

An embodiment of my invention is illustrated by way of example in the drawings affixed hereto and forming part of my specification.

In the drawings are:

Fig 1 a diagrammatic plan of the improved copying machine,

Fig. 2, a vertical cross-section along line II—II of Fig. 1,

Fig. 3, a similar cross-section along line III—III of Fig. 1,

Fig. 4, a back view of a mirror carrier, and

Fig. 5, a plan of the carrier according to Fig. 4.

Like parts are indicated by like numerals of reference in the various figures of the drawings.

Referring to the drawings, 1 is the framework of the machine which supports a table 2 upon which is mounted a vertical plate or wall 3 carrying all the essential parts of the machine. At both sides of the plate 3 lamps 4 and 5 are housed in totally enclosed casings or boxes 6 and 7 supported by arms 8 and 9. These arms are adapted to be turned or fixed in clips 10 and 11. The ceilings of the lamp boxes 6 and 7 carry chimneys 12 and 13 for discharging the heat developed by the lamps 4 and 5. The sides of the box 6 and 7 facing the plate 3 are designed as covers or lids and carry tubes 14 and 15 which direct the beam of light from the lamps 4 and 5 through an opening 16 in the plate 3 on to the mirrors 18 or 17. The tubes 14 and 15 are of square cross-section and guided in bushings 19 and 20 which are mounted upon the plate 3 by horizontal supports 21 and 22. Between the mirror 17 and the wall 3 a window is arranged upon the wall, consisting of two parts 23, $23^1$, one placed upon the other, between which the film 24 passes. The film is unwound from a reel 26 carried by a standard 25 on the machine table, passes over a toothed roller 27, between the windows 23, 23' and across a toothed roller 28 on to a reel 29 under the table 2. Against the toothed rollers 27, 28 abut elastically journaled press rollers 30 or 31. The film 24 is intermittently moved past the mirrors 17, 18 by grippers 32 mounted upon a slide 33 adapted to be reciprocated vertically by a crank 34 and connecting rod 35. During the descent of the slide 33 the grippers 32 mounted upon a spring 36 are pressed against the window 23 by the crank disc 34 whereby the film 24 is engaged at both edges and fed forward by a distance corresponding with the length of the stroke of the crank. The film reel 29 is driven from a motor 37 by chain or cord drives 38, 39, 40, while the reel 26 turns freely in its bearings.

In the direction of the axes of the mirrors 17 and 18 there are arranged the objectives 41 and 42 and between the mirrors and the objectives sector-shaped screening discs 43 and 44 of the usual construction, as shown in Figs. 1 and 2 of the drawings. The objectives 41 and 42 are preferably supported in the holders 45 an 46 which are adapted to be adjusted vertically as well as horizontally. Behind the objectives 41, 42 there are located mirrors 47 and 48 (Figs. 1 and 3), which transfer the picture taken by the film 24 on to a film 49 passed through a two-part window 50 (Fig. 3). The film 49 travels in the opposite direction to the film 24 and comes from a real 51 journaled in a casing 52 mounted upon the machine frame 1. The film 49 passes through an opening in the table 2, over a toothed roller 52, over a second toothed roller 54 on to the reel 55. This reel 55 is driven by the chain drive 56, 57, 58 and pulls the film 49 in the direction indicated by arrows. In order to enable the film 49 also to be moved intermittently past the mirrors 47, 48, grippers 59 are provided upon a spring 60. The spring is adapted to be vertically reciprocated by a slide 61, a crank 62 and a connecting rod 63. Since the film 49 travels in the opposite direction to the film 24, the grippers 59 must pull the film 49 upwards, that is they must be forced against the film 49 by the crank disc 62 during the ascent of the slide 61.

In order to enable the mirrors 17, 18 or 47, 48 respectively to be adjusted accurately they are placed in frames which are adapted to turn around a central bolt and to receive the necessary fine adjustment (tilt) by means of adjusting screws. In the Figs. 4 and 5 of the drawings the mirror holder is shown in back view and plan. On a bracket 64 is mounted a wall 65 arranged at an angle of 45 degrees and which carries in the center a bolt 66. Upon this bolt is adapted to rock a plate 67 with a groove 68 into which is inserted the mirror 69. Around the bolt 66 there are provided in the wall 65 four adjusting screws 70 which abut with their ends against the plate 67. In this way it is possible to give the plate 67 any desired tilt and to adjust the mirror accurately on the objective or the film to be copied.

The manner of operation of the new machine will be readily understood from this specification, which also clearly shows that the accurate adjustment of the optical equipment aimed at is actually attained.

Various modifications and changes may be made without departing from the spirit and the scope of the invention, and I desire, therefore, that only such limitations shall be placed thereon as are imposed by the prior art.

I claim as my invention:

1. In a device of the character described, a support, a plate rising from said support and provided with two apertures, a source of light on each side of said plate opposite a portion of said aperture, means for adjusting each source of light so that the axes of the beams of rays become offset but parallel to each other, mirrors adjacent said first aperture, means for directing light from each of said sources of light onto said mirrors, means for directing said light onto a further set of substantially opposed mirrors and through said second aperture, and means for interrupting said light at predetermined intervals.

2. In a device of the character described, a support, a plate rising from said support and provided with two apertures, a source of light on each side of said plate opposite a portion of said aperture, means for adjusting each source of light so that the axes of the beams of rays become offset but parallel to each other, mirrors adjacent said first apertures, means for directing light from each of said sources of light onto said mirrors, means for directing said light onto a further set of substantially opposed mirrors and through said second aperture, means for interrupting said light at predetermined intervals, a double framed window for each aperture, a film for each window and guided thereby, and means adapted to intermittently advance the film past the respective mirrors and apertures in opposite directions to each other.

3. In a device of the character described, a support, a plate rising from said support and provided with two apertures, a source of light on each side of said plate opposite a portion of said aperture, means for adjusting each source of light so that the axes of the beams of rays become offset but parallel to each other, mirrors adjacent said first apertures, means for directing light from each of said sources of light onto said mirrors, means for directing said light onto a further set of substantially opposed mirrors and through said second aperture, means for interrupting said light at predetermined intervals, a double framed window for each aperture, a film for each window and guided thereby, means adapted to intermittently advance the films past the respective mirrors and apertures in opposite directions to each other, said film advancing means comprising a slide, grippers on the slide for the film, a crank continuously rotated from a motive source, and a rod connecting the crank with the slide, thereby communicating a reciprocating motion of said slide.

In testimony whereof I have affixed my signature.

LUDWIG HORST.